(12) United States Patent
Thivierge

(10) Patent No.: US 7,755,326 B1
(45) Date of Patent: Jul. 13, 2010

(54) BATTERY MONITORING AND CHARGING SYSTEM

(75) Inventor: Daniel P. Thivierge, Warren, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 339 days.

(21) Appl. No.: 11/831,197

(22) Filed: Jul. 31, 2007

(51) Int. Cl.
*H02J 7/00* (2006.01)

(52) U.S. Cl. .................. 320/116; 320/122; 320/134; 320/150; 702/63

(58) Field of Classification Search ............. 320/116, 320/118, 119, 122, 134, 150; 324/433, 434; 702/58, 63, 64
See application file for complete search history.

(56) References Cited

U.S. PATENT DOCUMENTS

| 6,094,031 | A  | * | 7/2000 | Shimane et al. ............. 320/118 |
|---|---|---|---|---|
| 6,404,166 | B1 | * | 6/2002 | Puchianu .................... 320/116 |
| 7,405,579 | B2 | * | 7/2008 | Okamoto et al. ............ 324/713 |
| 7,508,166 | B2 | * | 3/2009 | Ishikawa et al. ............ 320/118 |
| 2005/0057219 | A1 | * | 3/2005 | Kaminski et al. ........... 320/116 |
| 2005/0242776 | A1 | * | 11/2005 | Emori et al. ................ 320/116 |
| 2007/0139007 | A1 | * | 6/2007 | Lim et al. ................... 320/116 |
| 2007/0247115 | A1 | * | 10/2007 | Ishikawa et al. ............ 320/119 |

* cited by examiner

*Primary Examiner*—Edward Tso
*Assistant Examiner*—Ramy Ramadan
(74) *Attorney, Agent, or Firm*—James M. Kasischke; Michael P. Stanley; Jean-Paul A. Nasser

(57) ABSTRACT

A battery monitoring device for a battery having cells grouped in modules. The device includes a monitoring circuit for each module which monitors the voltage in each cell and the overall module voltage. The monitoring circuits can also detect module temperatures. The monitoring circuits are networked to a control computer. The device can be used with a power supply and relays for each module to interrupt charging when a fault condition is detected by the monitoring circuits. Other features of the device allow equalization of cells having excessive voltages.

3 Claims, 3 Drawing Sheets

BATTERY MONITORING AND CHARGING SYSTEM

STATEMENT OF GOVERNMENT INTEREST

The invention described herein may be manufactured and used by or for the Government of the United States of America for Governmental purposes without the payment of any royalties thereon or therefore.

BACKGROUND OF THE INVENTION (1) Field of the Invention

The present invention relates generally to power management circuitry for a battery, and in particular to modular, digital power management circuitry.

(2) Description of the Prior Art

High power level rechargeable batteries are often necessary for specific applications. These batteries are made up of a plurality of series connected cells grouped in modules. In electric vehicle applications, batteries such as this are often capable of delivering in excess of 100 KW at a voltage of 400 VDC or above. A battery of this nature can have in excess of one hundred cells divided into individual modules or banks of cells.

A battery of this power level must be handled very carefully and monitored very closely during charge and discharge. This is particularly true of lithium ion batteries. The voltage of each cell must be monitored during discharge to ensure that no cell voltage is allowed to drop below approximately 2.1 VDC. Allowing a cell voltage below this level may cause irreversible damage to the cell. More importantly the voltage of each cell must be carefully monitored and controlled while charging. Overcharging a cell beyond approximately 4.3 VDC can result in catastrophic failure of the cell.

It is also desirable that all cells remain at the same voltage level, charge at the same rate, and reach the desired final voltage level at the same time. In practice, however, this is not the case; cell charge and discharge characteristics vary. All cells must be monitored very closely during charging. If any cell (or group of cells) reaches a predefined upper voltage limit prior to the rest of the cells, charging is suspended and the rogue cells must be discharged to the voltage level of the other cells. This process is referred to as "cell equalizing" or "cell equalization".

Monitoring battery temperature during charge and discharge is also very important. Cell temperatures should not be allowed to exceed a predetermined temperature. If this temperature is reached, corrective action must be taken immediately. This corrective action can include shutting down the charge or discharge process or activating a cooling system.

These problems are specifically acute when using lithium-ion batteries; however, other battery chemistries have similar problems. In view of the prior art, there is a need for a battery monitoring and charging system that allows full monitoring and control of the battery.

SUMMARY OF THE INVENTION

One embodiment of the invention provides a battery monitoring device for a battery having cells grouped in modules. The device includes a monitoring circuit for each module which is connected in such a way as to monitor the voltage of each individual cell in the module in addition to the overall module voltage. The monitoring circuits can also detect module temperatures. The monitoring circuits are networked to a single control computer. During charging, each module's monitoring circuit is in direct control of a relay connecting the charge power supply to the battery and can interrupt charging when a fault condition is detected.

BRIEF DESCRIPTION OF THE DRAWINGS

The foregoing invention will become readily apparent by referring to the following detailed description and the appended drawings in which.

DESCRIPTION OF THE PREFERRED EMBODIMENT

Figure 1:
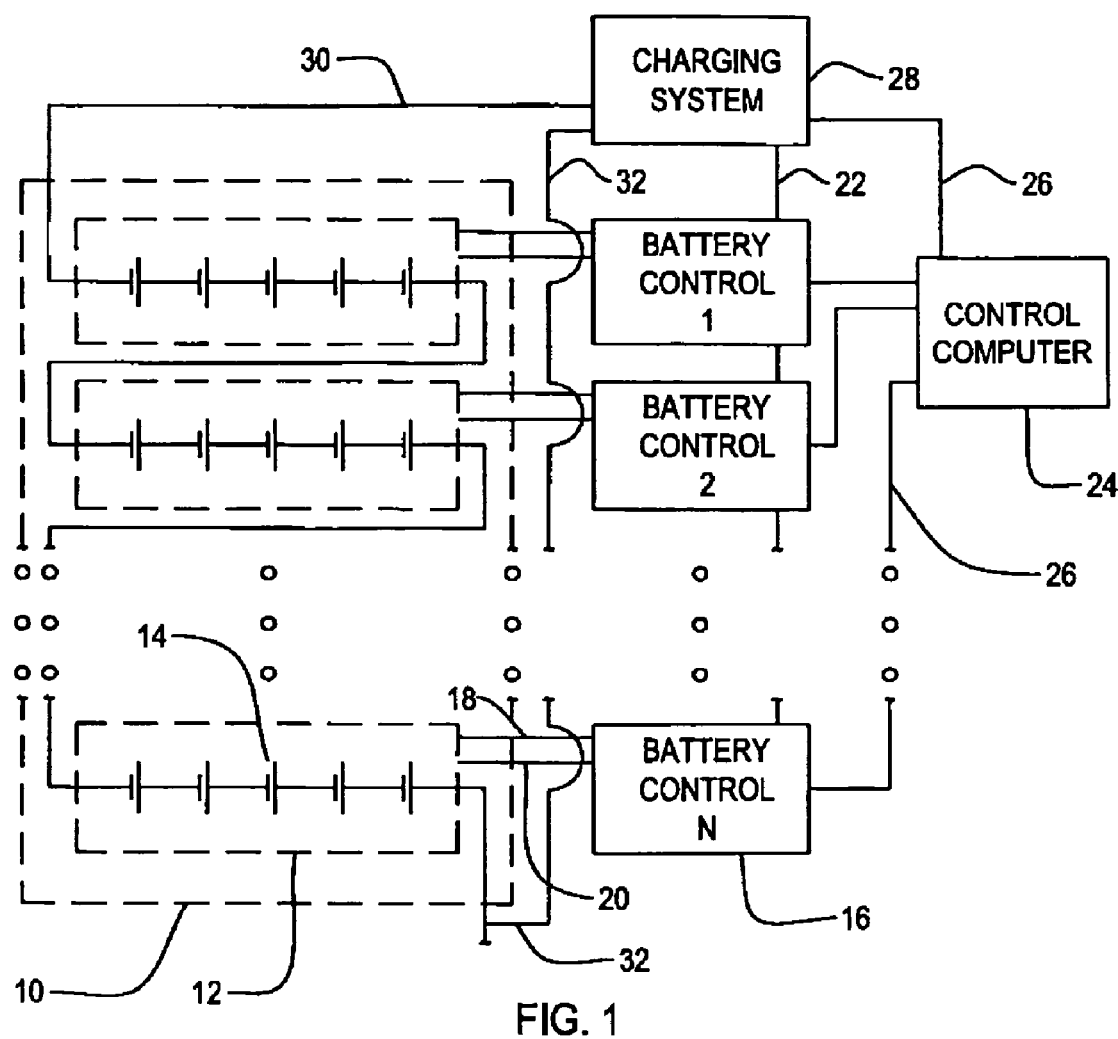
FIG. 1 is a diagram providing an overview of an embodiment of the device and the associated battery.

This embodiment provides a modular battery monitoring and charging system. The battery 10 is subdivided into a plurality of battery modules 12 each having a plurality of cells 14. Each module 12 has a battery control board 16 associated with that module 12. Each battery control board 16 has multiple temperature monitoring connections 18, multiple cell connections 20 used for cell voltage monitoring and cell equalization, and a power relay connection 22. Internal connections within module 12 and battery control board 16 will be shown hereinafter. Module 12 is only defined by its connection to a single battery control board 16, and module 12 can have as many cells 14 as battery control board 16 can monitor. The battery control boards 16 are joined to a control computer 24 by a network 26. For identifying the separate control boards 16 to the control computer 24, each board 16 has a dip switch, memory, or other means for giving it a unique network address. This network 26 can be Ethernet™, wi-fi or any other networking technology. The charge control computer 24 provides coordination and control of the modules during discharge and charging. In order to charge battery 10, there is a charging system 28 joined to network 26 and control computer 24. Charging system 28 is further joined to power relay connection as discussed with relation to FIG. 3. Charging cables 30 and 32 are connected to the low and high side of battery 10, respectively.

Figure 2:
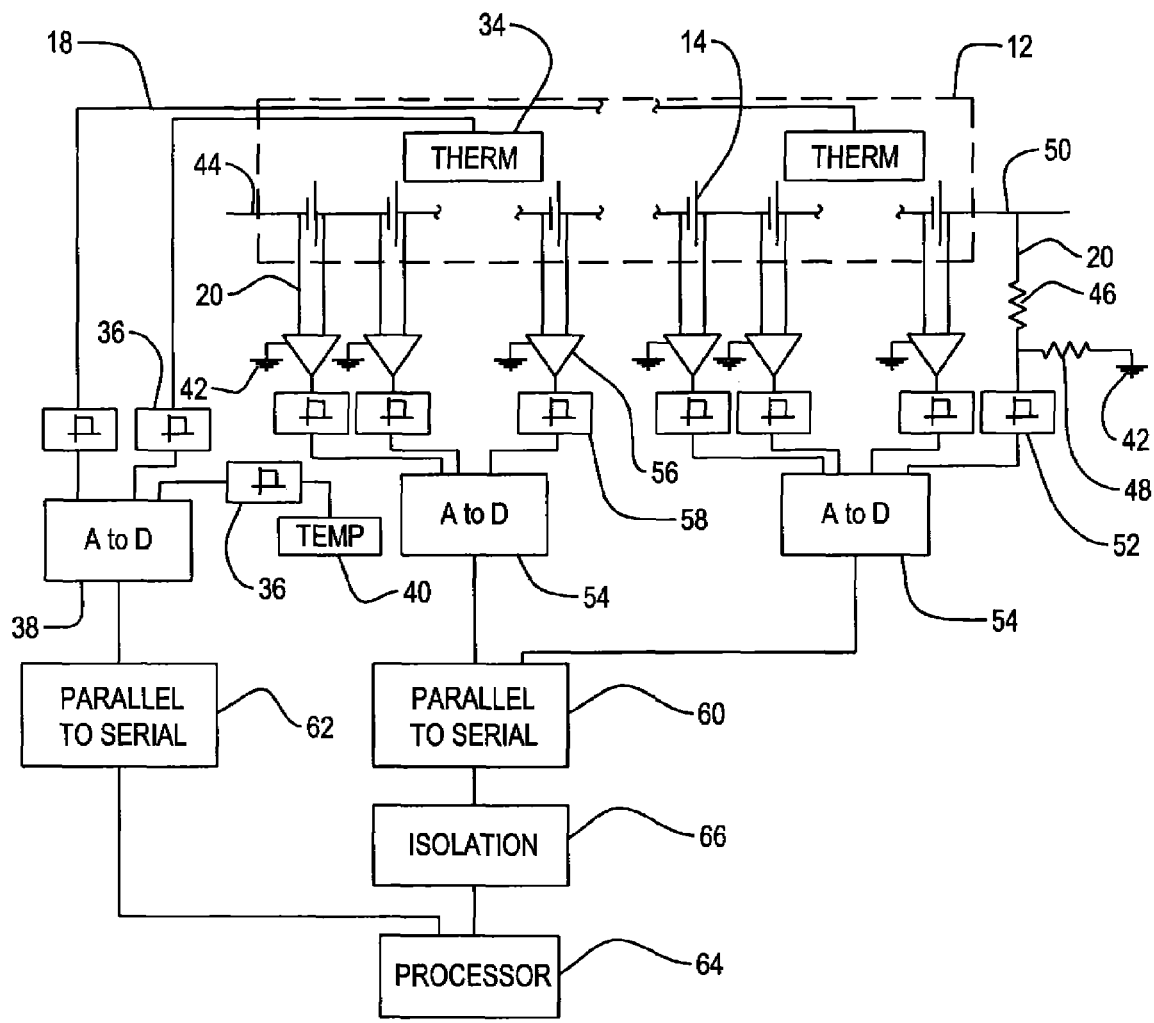
FIG. 2 is a diagram showing the battery monitoring functions of the battery control board.

FIG. 2 shows an embodiment of the voltage and temperature monitoring aspects of the battery control board 16. As discussed above, each battery control board 16 is joined to a group of cells 14 arranged in a module 12 of battery 10. Board 16 is joined to monitor the temperature of cells 14 in the module by thermistors 34 joined within module 12. Thermistors 34 are dispersed among cells 14 to monitor their temperatures and are joined to temperature monitoring connection 18. Each thermistor 34 is connected to a low pass filter 36 for reducing noise in the temperature signal. The outputs of low pass filters 36 are joined to a multi-channel temperature analog to digital converter 38. At least one board temperature sensor 40 is also joined to the temperature analog to digital converter 38 through low pass filter 36. Board temperature sensor 40 provides the local temperature of the battery control board 16 and of the equalization circuitry, shown in FIG. 4, that is installed on control board 16. This embodiment is capable of utilizing as many thermistors 34 and temperature sensors 40 as necessary to monitor module 12. As such, this disclosure should not be limited by the number of thermistors or sensors shown. Furthermore, other temperature sensing devices can be used in place of thermistors. These include thermocouples and other temperature sensing components.

Voltage monitoring connection 20 is required to monitor the voltage in each cell 14 as well as the overall voltage of the module 12. Ground 42 for these purposes is the lowest voltage in module 12. This is the voltage identified at 44. In view of the series arrangement of battery 10 and modules 12, ground 42 for the specific module 12 could be well above the base voltage of battery 10. Components of the embodiment must be capable of operating with these voltage differentials. The overall voltage of the module 12 is measured by a voltage divider utilizing resistors 46 and 48 set up between the highest voltage in the module 12 and the ground 42. The highest voltage for module 12 is that at point 50. The voltage divider is connected to the input of an op amp configured as a low pass filter 52 for reducing noise in the overall voltage measurement. The filter output is connected to a voltage analog to digital converter 54.

Cell voltages are measured by joining voltage monitoring connection 20 on both sides of each cell 14. The voltage between the high voltage and low voltage of each side of cell 14 is measured by a differential amplifier 56. Differential amplifier 56 can be any differential amplifier having a common mode voltage rating capable of handling the highest voltage 50 in the module 12. The output of the differential amplifier 56 is connected to voltage analog to digital converter 54 through a low pass filter 58. Differential amplifiers 56 convert the various differential measurement common mode cell voltage levels present in the module and reference them all to a common ground 42 preventing these voltages from adversely affecting analog to digital converter 54. Low pass filters 58 eliminate high frequency noise that may be present on the cell voltage signals. Low pass filters 58 can be implemented as two pole active low pass filters or as a passive low pass filters. Cutoff frequency of these filters 58 should be chosen as is necessary to eliminate high frequency noise.

As described above, filtered voltage measurements from the cells and the overall module voltage divider output are provided to one or more voltage analog to digital converters 54. The number of converters 54 is dictated by the number of cells 14 in module 12 and the number of channels in each analog to digital converter 54. The digital output of voltage analog to digital converters 54 is serialized by a parallel to serial interface 60. Temperature analog to digital converter 38 are serialized by a separate parallel to serial interface 62 because analog to digital converter 38 operates at the same ground level as the processor 64 and does not require isolation. Interfaces 60 and 62, which may be integral to the analog to digital converter, convert signals from the analog to digital converters into a serial form that can be interfaced to the serial interface of processor 64. The function of processor 64 can be implemented using a wide range of digital signal processors, microcontrollers, or microprocessors. The serial output of interface 60 is isolated from processor 64 by an isolator 66. Isolator 66 allows the processor 64 to operate at a common, system wide, ground rather than the module specific ground 42 discussed above. This allows the processors 64 from all control boards 16 to be powered from a single power supply.

Figure 3:
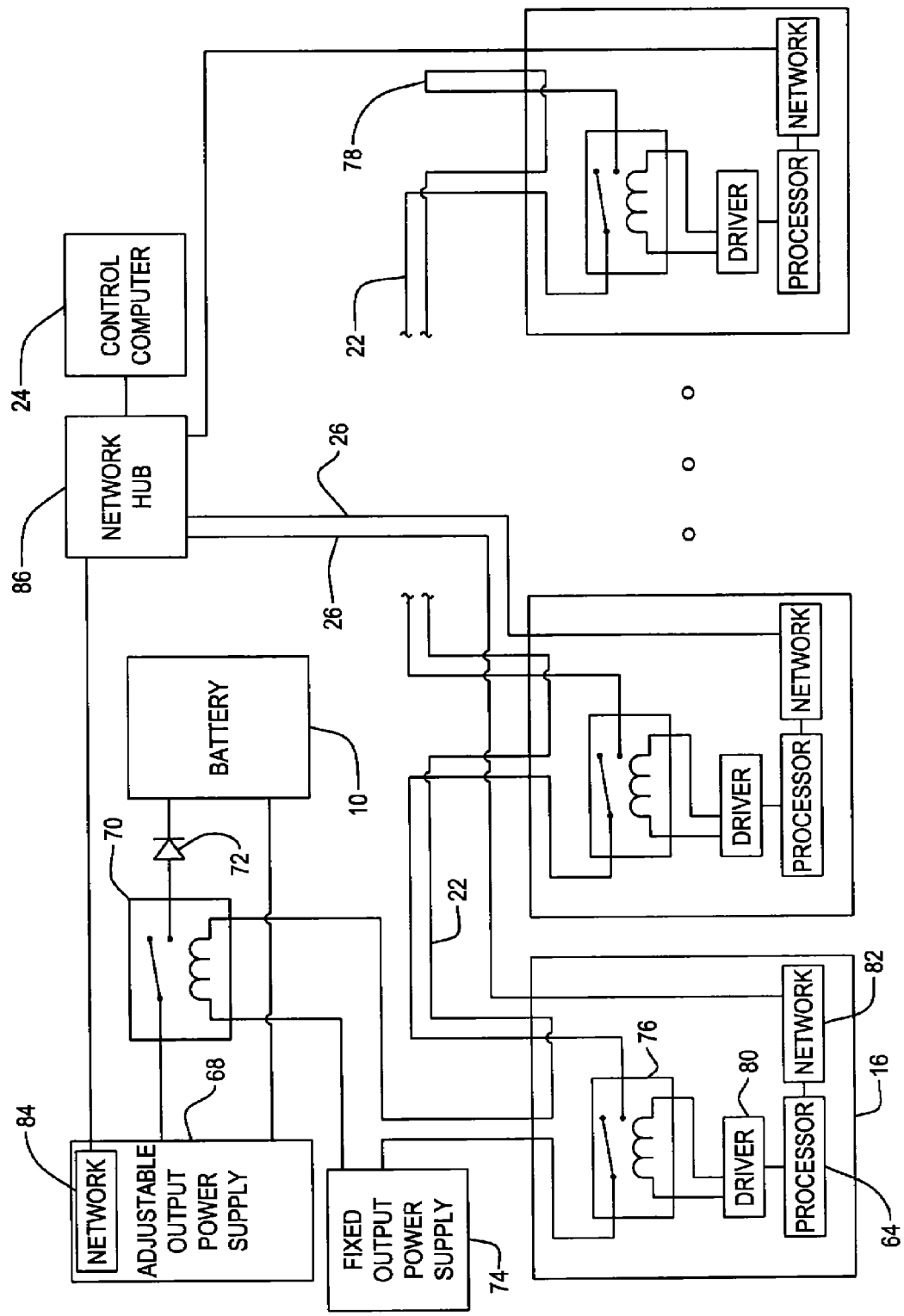
FIG. 3 is a diagram of the relay control apparatus for suspending battery charging in the event of a system fault or at charge completion.

FIG. 3 shows power relay control connection 22 that switches voltage to battery 10 during charging. Control computer 24 is joined by network 26 to each board 16 for controlling power distribution during charging and equalization. Control computer 24 is also joined by network 26 to an adjustable output charging power supply 68. Charging power supply 68 is joined to charge battery 10 through a main power relay 70 and blocking diode 72 which prevents current from flowing from the battery back to the power supply 68 when the power supply 68 is turned off. The control coil of main relay 70 is energized by a fixed output power supply 74. The control coil of main relay 70 and the fixed output power supply 74 are in series with a board relay 76 on each of the battery control boards 16. If any one of the relays 76 is open then relay 70 is open and power supply 68 is disconnected from battery 10. In the embodiment shown, power relay control connection 22 on boards 16 are connected in a series as a bus with the last connection having a terminator 78. In other embodiments, the boards 16 could be connected directly in series with the last board being connected directly to relay 70 instead of through each board 16, as shown.

On each board 16, board relay 76 is connected to processor 64 through a driver 80. Driver 80 is provided merely for giving the required control power for relay 76 and may not be necessary in some embodiments. Processor 64 is further connected to a network driver 82 in communication with network 26. Processor 64 can control board relay 76 when it receives a command from control computer 24 or when it detects a fault through the sensors provided in relation to FIG. 2.

Adjustable output power supply 68 has a network driver 84 installed to communicate with network 26. This allows control computer 24 to disable the adjustable output power supply 68 in case of fault or equalization. Network 26 is joined to a network hub 86. Control computer 24 is joined to network hub 86 through network 26.

Figure 4:
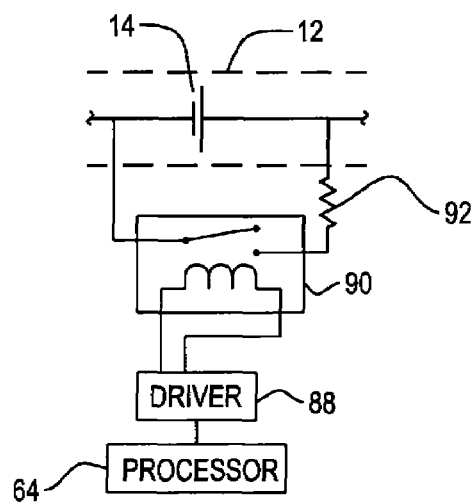
FIG. 4 is a diagram of the cell equalization circuitry.

FIG. 3 and FIG. 4 show the circuitry necessary to equalize a cell 14 in a module 12. Equalization is necessary when a cell 14 charges too fast and reaches a predefined upper limit before the rest of the cells 14. This is detected first by the cells monitoring circuit board 16 and is communicated by board 16 to control computer 24 through network 26. This equalization process is achieved by first opening main relay 70 thereby disconnecting power supply 68 from battery 10. Processor 64 controls the main relay 70 by controlling its associated board relay 76. Processor 64 then sends a signal to equalization driver 88 which activates equalization relay 90. Equalization driver 88 and equalization relay 90 should cooperate to isolate processor 64 from ground 42. Activation of equalization relay 90 places an equalization resistor 92 in parallel with cell 14. Equalization relay 90 can be a photovoltaic relay, reed relay or other type of switch having the appropriate activation energy, current, and voltage ratings. Processor 64 monitors equalization voltage through voltage monitoring circuitry shown in FIG. 2 until cell 14 voltage has been reduced to the desired level communicated by control computer 24. Each cell 14 has its own equalization relay 90 and power resistor 92. Once the cell or cells that were selected for equalizing have all reached the desired final voltage, all equalization relays 90 are opened, board relays 76 and main relay 70 are closed and charging resumes.

This embodiment features multiple layers of redundant fault sensing and control that are designed into the device. When charging, control computer 24 can be an external computer in constant communications with battery control boards 16 and with power supply 68 which has its own network interface 84. Control computer 24 commands the power supply 68 voltage to 0 VDC and disables power supply's output 68 if it receives cell voltage or temperature data from one of the battery control boards 16 that is out of acceptable range specified by the user. Control computer 24 also disables power supply 68 if it loses communication with any of the battery control boards or receives a fault message from one of the boards.

The processor 64 on each battery control board is programmed to sample cell voltages and temperatures several times a second. Processor 64 compares these cell voltages to high and low voltage limits defined by the user and communicated to the processor 64 through a graphical user interface on control computer 24. The graphical user interface can display cell voltage, module voltage, module temperatures and board temperatures. The graphical user interface can also provide user control for charging and equalization. Each processor 64 controls board relay 76 that controls the coil of main relay 70. The voltage controlling main relay 70 and passing serially through board relays 76 on boards 16 is supplied from an external fixed output power source 74. All processors 64 must close their respective board relays 76 in order for power to be applied to the main relay 70 that electrically connects the charge power supply 68 to the battery 10. If any of the processors 64 senses a fault condition or loses communication with the control computer 24, that processor 64 will command its board relay 76 to open which will also open the main relay 70 disconnecting the charge power supply 68 from the battery 10.

It is to be understood that the foregoing description and specific embodiments are merely illustrative of the best mode of the invention and the principles thereof, and that various modifications and additions may be made to the invention by those skilled in the art, without departing from the spirit and scope of this invention, which is therefore understood to be limited only by the scope of the appended claims.

What is claimed is:

1. A battery monitoring device for a battery having a plurality of cells grouped in modules, said device comprising:
    a monitoring circuit associated with each module connected to obtain a voltage from each cell, each cell having a cell identifier, said monitoring circuit having a network interface for transmitting obtained voltages and the associated cell identifier;
    a control computer having a network interface for receiving obtained voltages transmitted by said monitoring circuit;
    a network joined between said monitoring circuit network interfaces and said control computer network interface;
    wherein said monitoring circuit further comprises:
    a differential amplifier associated with each cell in the module and joined to the high voltage side of the cell and the low voltage side of the cell to provide a voltage signal proportional to the voltage of the cell;
    a plurality of analog to digital converters, each converter being joined to each differential amplifier for providing a digital representation of the voltage signal from each differential amplifier;
    a processor joined to said analog to digital converters for receiving the digital representations of the voltage signals and monitoring the voltages, said processor further providing the obtained voltages to said monitoring circuit network interface;
    at least one means for monitoring temperature positioned in each module, said monitoring circuit network interface being capable of transmitting monitored temperatures and said control computer being capable of receiving the transmitted monitored temperatures comprising:
    at least one temperature sensor positioned in said module capable of providing an analog temperature signal; and
    a temperature analog to digital converter associated with each temperature sensor, each temperature analog to digital converter being joined to each temperature sensor for providing a digital temperature signal of the analog temperature signal from each temperature sensor;
    said processor being joined to said temperature analog to digital converters for receiving the digital temperature signal and monitoring the temperatures, said processor further providing the monitored temperatures to said monitoring circuit network interface.

2. A battery monitoring device for a battery having a plurality of cells grouped in modules, said device comprising:
    a monitoring circuit associated with each module connected to obtain a voltage from each cell, each cell having a cell identifier, said monitoring circuit having a network interface for transmitting obtained voltages and the associated cell identifier, said monitoring circuit being capable of determining a fault condition based on said obtained voltages;
    a monitoring circuit relay joined to be controlled by an associated monitoring circuit when the associated monitoring circuit determines a fault condition;
    a control computer having a network interface for receiving obtained voltages transmitted by said monitoring circuit;
    a power supply having a network interface, said power supply having an output being controllable by said network interface to charge a battery;
    a main relay joined to switch said power supply output to the battery and joined to be controlled by said control computer and said monitoring circuit relays;
    a network joined between said monitoring circuit network interfaces and said control computer network interface;
    wherein said monitoring circuit further comprises:
    a differential amplifier associated with each cell in the module and joined to the high voltage side of the cell and the low voltage side of the cell to provide a voltage signal proportional to the voltage of the cell;
    a plurality of analog to digital converters, each converter being joined to each differential amplifier for providing a digital representation of the voltage signal from each differential amplifier; and
    a processor joined to said analog to digital converters for receiving the digital representations of the voltage signals and monitoring the voltages, said processor being joined to control said monitoring circuit relay on detection of a fault condition, said processor further providing the obtained voltages to said monitoring circuit network interface
    at least one means for monitoring temperature positioned in each module, said monitoring circuit network interface being capable of transmitting monitored temperatures and said control computer being capable of receiving the transmitted monitored temperatures wherein said means for monitoring temperature comprises:
    at least one temperature sensor positioned in said module capable of providing an analog temperature signal; and
    a temperature analog to digital converter associated with each temperature sensor, each temperature analog to digital converter being joined to each temperature sensor for providing a digital temperature signal of the analog temperature signal from each temperature sensor;
    said processor being joined to said temperature analog to digital converters for receiving the digital temperature signal and monitoring the temperatures, said processor further providing the monitored temperatures to said monitoring circuit network interface, said monitoring circuit being capable of determining a fault condition based on said monitored temperatures.

3. The device of claim 2 further comprising at least one circuit temperature sensor positioned in said monitoring circuit capable of providing an analog circuit temperature, said temperature analog to digital converter capable of receiving said analog circuit temperature and providing a digital circuit temperature to said processor, said digital circuit temperature being one of said monitored temperatures.

* * * * *